United States Patent
Noguchi et al.

(10) Patent No.: US 9,677,643 B2
(45) Date of Patent: Jun. 13, 2017

(54) NOTCHED TRANSMISSION BELT

(71) Applicant: BANDO CHEMICAL INDUSTRIES, LTD., Kobe-shi (JP)

(72) Inventors: Tadahiko Noguchi, Kobe (JP); Kyotaro Yanagi, Kobe (JP); Tomonari Nakamura, Kobe (JP); Takamitsu Akashi, Kobe (JP); Toshiaki Kitai, Kobe (JP)

(73) Assignee: BANDO CHEMICAL INDUSTRIES, LTD., Kobe-Shi (JP)

( * ) Notice: Subject to any disclaimer, the term of this patent is extended or adjusted under 35 U.S.C. 154(b) by 180 days.

(21) Appl. No.: 14/605,369

(22) Filed: Jan. 26, 2015

(65) Prior Publication Data

US 2015/0141186 A1    May 21, 2015

Related U.S. Application Data

(63) Continuation of application No. PCT/JP2013/003824, filed on Jun. 19, 2013.

(30) Foreign Application Priority Data

Jul. 26, 2012   (JP) .................. 2012-166202

(51) Int. Cl.
| | |
|---|---|
| F16G 1/21 | (2006.01) |
| F16G 1/22 | (2006.01) |
| F16G 5/16 | (2006.01) |
| F16G 1/28 | (2006.01) |
| F16G 5/20 | (2006.01) |
| F16G 5/00 | (2006.01) |
| F16G 5/10 | (2006.01) |

(52) U.S. Cl.
CPC ...... *F16G 5/20* (2013.01); *F16G 5/10* (2013.01)

(58) Field of Classification Search
CPC .... F16G 5/20; F16G 5/06; F16G 5/166; F16G 1/28; B29D 29/106
USPC .......................... 474/250, 265, 242
See application file for complete search history.

(56) References Cited

U.S. PATENT DOCUMENTS

| | | | | |
|---|---|---|---|---|
| 585,416 | A * | 6/1897 | Wattles ................. | F16H 55/36 474/167 |
| 994,150 | A * | 6/1911 | Gilmer .................. | F16G 5/16 474/242 |
| 1,701,507 | A * | 2/1929 | Roderwald ............. | B29D 29/106 156/138 |
| 1,982,869 | A * | 12/1934 | Heyer ................... | B29D 29/106 156/141 |
| 2,065,180 | A * | 12/1936 | Freedlander .......... | B29D 29/106 156/138 |

(Continued)

FOREIGN PATENT DOCUMENTS

| | | |
|---|---|---|
| CN | 1486402 A | 3/2004 |
| CN | 1769036 A | 5/2006 |

(Continued)

*Primary Examiner* — Henry Liu
(74) *Attorney, Agent, or Firm* — Knobbe Martens Olson & Bear LLP

(57) ABSTRACT

A notched transmission belt has a plurality of notches whose bottom in a cross-section taken along a plane orthogonal to the width direction of the belt includes a linear portion at a center, and recessed curved portions continuously formed at both sides of the linear portion.

2 Claims, 3 Drawing Sheets

(56) References Cited

U.S. PATENT DOCUMENTS

| | | | | |
|---|---|---|---|---|
| RE21,075 E * | 5/1939 | Freelander | B29D 29/106 | 428/111 |
| 2,167,384 A * | 7/1939 | Freedlander | F16G 5/20 | 428/161 |
| 2,189,049 A * | 2/1940 | Ungar | F16G 5/20 | 428/296.1 |
| 2,210,073 A * | 8/1940 | Freedlander | F16G 5/20 | 474/250 |
| 2,211,202 A * | 8/1940 | Freedlander | F16G 5/20 | 474/250 |
| 2,281,148 A * | 4/1942 | Freedlander | F16G 5/06 | 156/139 |
| 2,429,994 A * | 11/1947 | Crosby | F16G 5/20 | 474/250 |
| 2,442,037 A * | 5/1948 | Carter | F16G 5/00 | 156/140 |
| 2,608,874 A * | 9/1952 | Waugh | F16G 5/06 | 474/250 |
| 2,625,828 A * | 1/1953 | Nassimbene | F16G 5/20 | 474/250 |
| 2,802,511 A * | 8/1957 | Waugh | B29D 29/103 | 156/138 |
| 2,847,865 A * | 8/1958 | Rockoff | F16G 5/20 | 474/250 |
| 2,941,413 A * | 6/1960 | Huber | F16G 5/20 | 428/167 |
| 2,945,389 A * | 7/1960 | Casazza, Jr. | F16G 5/20 | 428/167 |
| 3,194,082 A * | 7/1965 | Mollenkamp | F16G 1/28 | 474/205 |
| 3,256,744 A * | 6/1966 | Papageorges | F16G 5/00 | 474/250 |
| 3,626,775 A * | 12/1971 | Gentry | F16G 5/166 | 474/148 |
| 3,776,054 A * | 12/1973 | Shichman | F16G 5/20 | 156/138 |
| 3,800,610 A * | 4/1974 | Wach | F16G 5/06 | 156/137 |
| 3,968,703 A * | 7/1976 | Bellmann | B29D 29/10 | 474/237 |
| 4,002,082 A * | 1/1977 | Waugh | F16G 5/08 | 474/250 |
| 4,003,269 A * | 1/1977 | Haines | F16G 5/20 | 474/250 |
| 4,011,766 A * | 3/1977 | Waugh | B29D 29/106 | 474/205 |
| 4,031,768 A * | 6/1977 | Henderson | F16G 5/14 | 474/250 |
| 4,034,615 A * | 7/1977 | Brooks | B29D 29/106 | 474/250 |
| 4,052,909 A * | 10/1977 | Warner | F16G 5/14 | 474/237 |
| 4,083,260 A * | 4/1978 | Carlson | F16G 5/166 | 474/260 |
| 4,108,012 A * | 8/1978 | Warner | F16G 5/00 | 474/237 |
| 4,127,039 A * | 11/1978 | Hollaway, Jr. | F16G 5/06 | 152/451 |
| 4,151,755 A * | 5/1979 | Allaben, Jr. | F16G 1/08 | 474/250 |
| 4,177,688 A * | 12/1979 | Howerton | B29D 29/103 | 156/137 |
| 4,188,832 A * | 2/1980 | Henderson | B29D 29/08 | 474/250 |
| 4,228,692 A * | 10/1980 | Jacob | F16G 5/20 | 156/139 |
| 4,264,314 A * | 4/1981 | Imamura | F16G 5/20 | 474/205 |
| 4,276,039 A * | 6/1981 | Takano | B29D 29/085 | 474/205 |
| 4,305,714 A * | 12/1981 | Renshaw | B29D 29/106 | 156/138 |
| 4,449,959 A * | 5/1984 | Matsumura | F16G 5/20 | 474/238 |
| 4,493,681 A * | 1/1985 | Takano | F16G 5/06 | 474/250 |
| 4,509,938 A * | 4/1985 | Woodland | F16G 5/20 | 474/263 |
| 4,555,241 A * | 11/1985 | Takano | F16G 5/06 | 474/205 |
| 4,559,029 A * | 12/1985 | Miranti, Jr. | F16G 5/00 | 474/205 |
| 4,571,230 A * | 2/1986 | Woodland | F16G 5/20 | 474/263 |
| 4,647,278 A * | 3/1987 | Hull | F16G 1/28 | 474/205 |
| 4,702,729 A * | 10/1987 | Tanaka | F16G 5/20 | 474/205 |
| 4,708,703 A * | 11/1987 | MacChiarulo | F16G 5/20 | 474/263 |
| 4,734,085 A * | 3/1988 | Takashima | F16G 5/166 | 474/201 |
| 4,741,726 A * | 5/1988 | Zarife | F16G 5/20 | 474/268 |
| 4,832,670 A * | 5/1989 | Miranti, Jr. | F16G 1/28 | 474/205 |
| 4,884,998 A * | 12/1989 | Miranti, Jr. | F16G 1/28 | 156/137 |
| 4,913,690 A * | 4/1990 | Di Giacomo | F16G 5/20 | 474/250 |
| 4,994,000 A * | 2/1991 | Simon | F16G 5/20 | 474/265 |
| 5,055,090 A * | 10/1991 | Miranti, Jr. | F16G 1/28 | 474/249 |
| 5,860,883 A * | 1/1999 | Jonen | C08K 5/098 | 474/205 |
| 6,102,823 A * | 8/2000 | Hosokawa | F16G 5/16 | 474/242 |
| 7,008,341 B2 * | 3/2006 | Wilson | F16G 5/20 | 474/205 |
| 7,927,243 B2 * | 4/2011 | Sato | F16G 5/06 | 474/242 |
| 2002/0094897 A1 * | 7/2002 | Love | F16G 5/20 | 474/260 |
| 2006/0060056 A1 * | 3/2006 | Hara | B29D 29/08 | 83/869 |
| 2010/0004084 A1 * | 1/2010 | Fan | F16G 5/20 | 474/242 |
| 2010/0279808 A1 * | 11/2010 | Fan | F16G 5/20 | 474/205 |
| 2012/0202634 A1 * | 8/2012 | Fan | F16G 5/20 | 474/265 |
| 2013/0053200 A1 * | 2/2013 | Fan | F16G 5/20 | 474/205 |
| 2013/0190120 A1 * | 7/2013 | Fan | F16G 5/20 | 474/205 |

FOREIGN PATENT DOCUMENTS

| | | |
|---|---|---|
| CN | 102165217 A | 8/2011 |
| JP | S57-031017 B2 | 7/1982 |
| JP | H04-041140 U | 4/1992 |
| JP | H05-296294 A | 11/1993 |
| JP | 2004-183764 A | 7/2004 |
| WO | 2010/126562 A1 | 11/2010 |

* cited by examiner

NOTCHED TRANSMISSION BELT

CROSS-REFERENCE TO RELATED APPLICATIONS

This is a continuation of International Application No. PCT/JP2013/003824 filed on Jun. 19, 2013, which claims priority to Japanese Patent Application No. 2012-166202 filed on Jul. 26, 2012. The entire disclosures of these applications are incorporated by reference herein.

BACKGROUND

The present invention relates to notched transmission belts each provided with a plurality of notches on the inner surface side of a belt body.

BACKGROUND ART

In recent years, notched transmission belts have been known where a plurality of notches extending in the width direction of the belt on the inner surface side of the V-belt are arranged at equal pitches along the longitudinal direction of the belt (for example, Japanese Unexamined Patent Publication No. 2004-183764).

Because of the notches, such belts are configured to reduce bending stiffness of the belt in the longitudinal direction thereof, and as a result, energy loss due to bending stress in the longitudinal direction of the belt can be reduced to lead to energy saving.

SUMMARY

The present invention is directed to a notched transmission belt including an endless belt body having a V-shaped cross-section, and a plurality of notches each extending in a width direction of the belt on an inner surface side of the belt body and arranged so as to be aligned with one another along a longitudinal direction of the belt, wherein a bottom of each of the notches in a cross-section taken along a plane orthogonal to the width direction of the belt includes a linear portion at a center, and recessed curved portions continuously formed at both sides of the linear portion.

DETAILED DESCRIPTION

An embodiment of the present invention will be described in detail with reference to the drawings.

Figure 1:
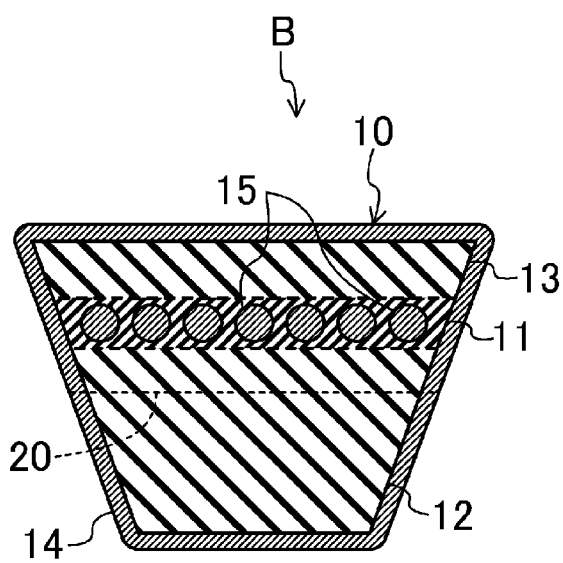
FIG. 1 is a cross-sectional view illustrating a configuration of a notched, wrapped V-belt according to an embodiment.

FIG. 1 illustrates a configuration of a notched, wrapped V-belt B (notched transmission belt) according to the embodiment. The notched, wrapped V-belt B according to the embodiment is utilized for, for example, large air conditioning fans, etc. The notched, wrapped V-belt B according to the embodiment has a length of, for example, 50.8 to 762 mm, and is specified in JIS A type (measured in accordance with Japanese Industrial Standards (JIS) K6323, the same hereinafter), JIS B type, JIS C type, or JIS D type. The belt B specified in JIS A type has a width of 12.5 mm, and a thickness of 9.0 mm. The belt B specified in JIS B type has a width of 16.5 mm, and a thickness of 11.0 mm. The belt B specified in JIS C type has a width of 22.0 mm, and a thickness of 14.0 mm. The belt B specified in JIS D type has a width of 31.5 mm, and a thickness of 19.0 mm.

The notched, wrapped V-belt B according to the embodiment includes an adhesion rubber layer 11 having a substantially rectangular cross-section, a bottom rubber layer 12 stacked on the inner surface side (the lower part of FIG. 1) of the adhesion rubber layer 11, and an upper rubber layer 13 stacked on a belt back surface side (the upper part of the figure) of the adhesion rubber layer 11, and an outer-cover canvas 14 covering the outer peripheral surface of the adhesion rubber layer 11, the bottom rubber layer 12, and the upper rubber layer 13. In the inside of the adhesion rubber layer 11, a cord 15 is embedded in the width direction of the belt (the horizontal direction of the figure) so as to be helically arranged at equal pitches. These elements form an endless belt body 10 having a V-shaped cross-section. Thus, the configuration of the belt body 10 is the same as that in a wrapped V-belt without a notch.

Figure 2:
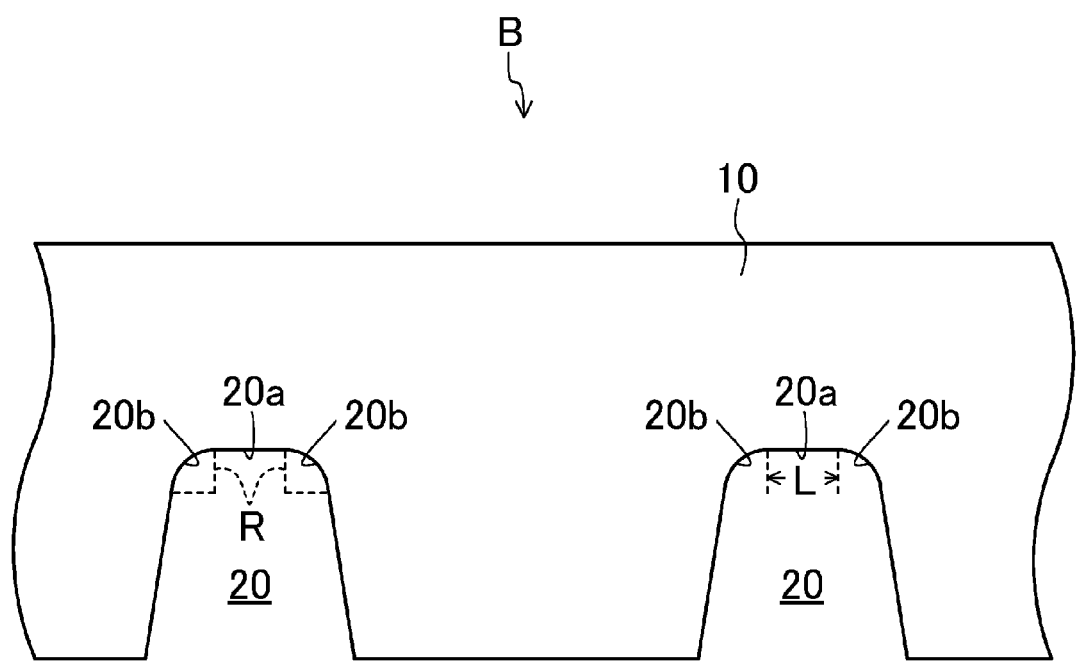
FIG. 2 is a side view partially illustrating the notched, wrapped V-belt according to the embodiment.

The notched, wrapped V-belt B according to the embodiment, as illustrated in FIG. 2, includes a plurality of notches 20 each extending in the width direction of the belt on the inner surface side of the belt body 10, and having a U-shaped groove cross-section taken along a plane orthogonal to the width direction of the belt, the plurality of notches 20 arranged so as to be aligned with one another at equal pitches along the longitudinal direction of the belt (the horizontal direction of the figure). The arrangement pitch of the notches 20 is preferably 9.0 to 11.0 mm and more preferably 9.5 to 10.5 mm in JIS A type, preferably 11.7 to 13.7 mm and more preferably 12.2 to 13.2 mm in JIS B type, preferably 13.5 to 15.5 mm and more preferably 14.0 to 15.0 mm in JIS C type, and preferably 19.0 to 21.0 mm and more preferably 19.5 to 20.5 mm in JIS D type. The maximum width (the width of the opening) of each of the notches 20 is 3.5±0.5 mm in JIS A type, 4.5±0.5 mm in JIS B type, 6.0±0.5 mm in JIS C type, and 10.0±1.0 mm in JIS D type. The bottom of each of the notches 20 in the cross-section taken along a plane orthogonal to the width direction of the belt includes a linear portion 20a extending in the longitudinal direction of the belt at the center, and recessed curved portions 20b continuously formed at both sides of the linear portion 20a.

In a conventional notched transmission belt, under an environment of heavy dust such as metal powders, dust including metal powders, etc., is likely to be stored in the bottom of each of the notches, and serves as a polishing material, thereby posing a problem of being likely to cause wear of a pulley surface in a short time.

However, the notched, wrapped V-belt B according to the embodiment includes the plurality of notches 20 each extending in the width direction of the belt on the inner surface side of the belt body 10 which has the same configuration as that in a wrapped V-belt without notches and arranged so as to be aligned with one another along the longitudinal direction of the belt, the bottom of each of the notches 20 in a cross-section taken along a plane orthogonal to the width direction of the belt including a linear portion 20a at a center, and recessed curved portions 20b continuously formed at both sides of the linear portion. Therefore, such a configuration can reduce wear of the pulley surface in a short time due to dust such as metal powders stored in the bottom of each of the notches, and obtain a crack resistance property similar to those obtained in the wrapped V-belt without notches.

Figure 3A:
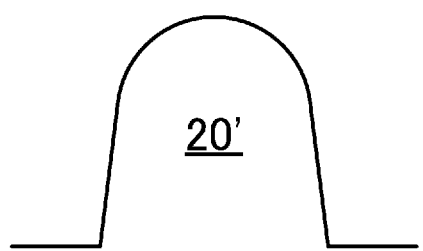
FIG. 3A is a side view of a notch whose bottom is curved before the belt is wrapped around a pulley.
Figure 3B:
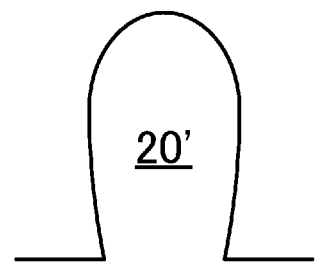
FIG. 3B is a side view of the notch whose bottom is curved after the belt is wrapped around the pulley.

Now consider the mechanism of the obtained advantage. If the bottom of a notch 20' is curve-shaped as illustrated in FIG. 3A, and the belt is wrapped around the pulley to cause the notch 20' to be compressed, the bottom of the notch 20' is deformed as illustrated in FIG. 3B such that the curvature of the bottom is reduced, and the dust stored in the bottom is compressed and pushed out toward the width direction and thickness direction of the belt. The smaller the diameter of the pulley is, the more significant the above tendency is. This is inconsistent with the energy-saving advantage obtained because of a small pulley.

Figure 4A:
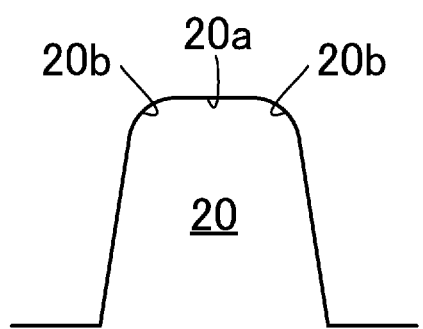
FIG. 4A is a side view of a notch whose bottom has a linear portion before the belt is wrapped around a pulley.
Figure 4B:
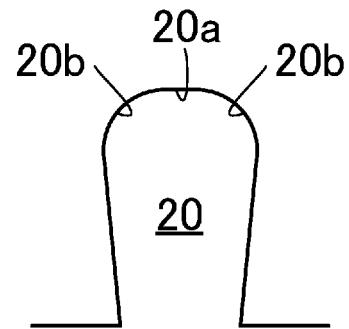
FIG. 4B is a side view of the notch whose bottom has the linear portion after the belt is wrapped around the pulley.

In contrast, as illustrated in FIG. 4A, if the linear portion 20a is formed in the bottom of the notch 20, and the belt is wrapped around the pulley to cause the notch 20 to be compressed, as illustrated in FIG. 4B, the bottom of the notch 20 is not deformed such that its curvature is reduced to the same extent as that shown in FIG. 3B. Therefore, this mitigates the effect of the dust compression, and the dust is less likely to be pushed out. If the bottom of the notch 20 has only the linear portion 20a, a stress may be intensively applied to the both ends of the linear portion 20a to quickly cause a crack, resulting in low durability. However, the curved portions 20b are provided in both sides of the linear portion 20a, whereby the stress may not be intensively applied to the both ends of the linear portion 20a.

Accordingly, in view of reducing the dust such as metal powders stored in the bottom of the notch 20, the length L of the linear portion 20a in the bottom of the notch 20 is preferably 0.5 mm or more in JIS A type, preferably 1.0 mm or more in JIS B type, preferably 2.5 mm or more in JIS C type, and preferably 3.0 mm or more in JIS D type.

In contrast, if the length L of the linear portion 20a is longer, a contact area of the side surface of the belt with the pulley, that is, an area where a pressure is applied is reduced, resulting in a high securing force applied to a unit area of the side surface of the belt. As a result, due to the both sides of the notch 20 to which the high securing force is applied from the pulley, a tearing force is applied to the notch 20, and a crack may be likely to occur. In view of this, the length L of the linear portion 20a is preferably 2.0 mm or less and more preferably 1.0 mm or less in JIS A type, preferably 4.0 mm or less and more preferably 2.0 mm or less in JIS B type, preferably 5.5 mm or less and more preferably 3.5 mm or less in JIS C type, and preferably 8.0 mm or less and more preferably 7.5 mm or less in JIS D type.

The radius of curvature R of the curved portion 20b in the bottom of the notch 20 is preferably 1.3 mm or more, and more preferably 1.4 mm or more in view of reducing occurrence of the crack in the both ends of the linear portion 20a.

If the radius of curvature R of the curved portions 20b is larger, the width of the notch 20 is larger, and a contact area of the side surface of the belt with the pulley, that is, an area where a pressure is applied is reduced, resulting in a high securing force applied to a unit area of the side surface of the belt. As a result, due to the both sides of the notch 20 to which the high securing force is applied from the pulley, a tearing force is applied to the notch 20, and a crack may be likely to occur. In view of this, the radius of curvature R of the curved portions 20b is preferably 1.6 mm or less, and more preferably 1.5 mm or less.

A belt running test performed on the notched, wrapped V-belts B specified in JIS A type and configured in accordance with the embodiment will be described to observe the amount of wear in the pulley if the length L of the linear portion 20a was varied.

In the belt running test, the radius of curvature R of the curved portion 20b of each of the notched, wrapped V-belts B had a constant value of 1.0 mm, and the length L of the linear portion 20a of each of the belts B was varied in 0.2 mm increments from 0 to 2.0 mm (0 mm≤L≤2.0 mm). A reduction amount in a specific pulley due to wear was measured after a belt running test machine allowed the notched, wrapped V-belts B to run for a predetermined time, and the reduction amount in the pulley due to wear was relatively evaluated with the reduction amount due to wear when the length L of the linear portion 20a was 0 mm as a reference.

Figure 5:
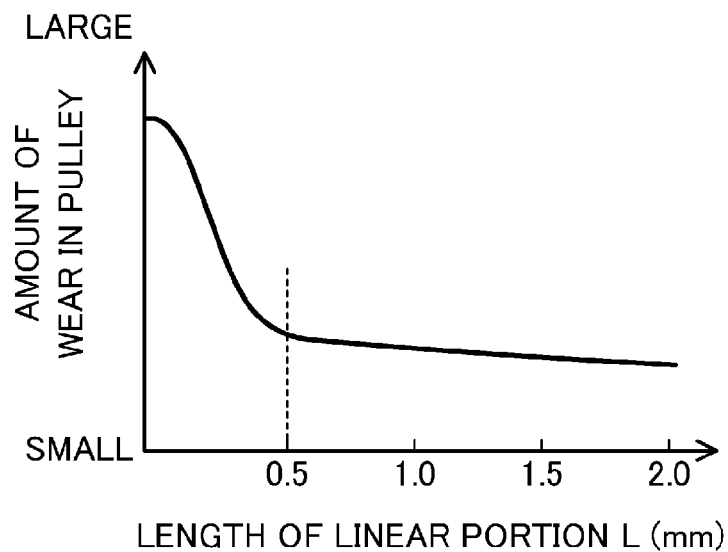
FIG. 5 illustrates a graph showing a relationship between a length of the linear portion and an amount of wear in pulley.

FIG. 5 shows a relationship between the length L of the linear portion 20a and the amount of wear in a pulley.

FIG. 5 shows that the amount of wear in the pulley is highest when the length L of the linear portion 20a in the bottom of the notch 20 is 0 mm, that the amount of wear in the pulley is significantly reduced when the length L is in the range of 0 to 0.5 mm, and that the amount of wear in the pulley is gradually reduced when the length L is 0.5 mm or more.

Such a phenomenon occurs because a discharge amount of the dust stored in the bottom of the notch 20 is larger when the length L of the linear portion 20a in the bottom of the notch 20 is shorter, but the discharge of the dust is reduced with an increase in the length L of the linear portion 20a in the bottom of the notch 20, and the discharge of the dust is reduced and the dust is not almost discharged when the length L of the linear portion 20a in the bottom of the notch 20 is 0.5 mm or more. As a result, the wear of the pulley surface is reduced. Accordingly, in view of reducing the dust stored in the bottom of the notch 20 to reduce the wear of the pulley surface, the length L of the linear portion 20a in the bottom of the notch 20 is preferably 0.5 mm or more (L≥0.5 mm).

Next, a belt running test performed on the notched, wrapped V-belts B specified in JIS A type will be described in order to observe the crack resistance property when the radius of curvature R of the curved portions 20b was varied.

In the belt running test, the linear portion 20a of each of the notched, wrapped V-belts B had a constant length L of 0.5 mm, and the radius of curvature R of the curved portion 20b was varied in 0.1 mm increments from 0 to 3.0 mm (0 mm≤R≤3.0 mm). When the R was 0 mm, the both ends of the linear portion 20a were located at a corner. The belt running test machine allowed these notched, wrapped V-belts B to run until a crack occurred in the notch 20, and a crack resistance property was relatively evaluated based on the time, which is referred to as 100, from beginning of running of the belt B having curved portions 20b each having a radius of curvature R of 0 mm to occurrence of a crack.

Figure 6:
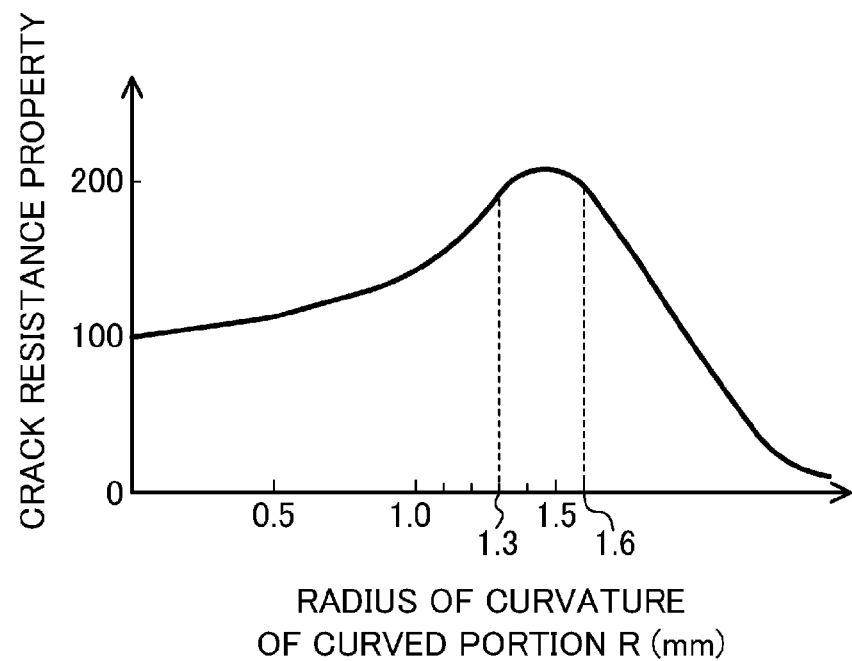
FIG. 6 illustrates a graph showing a relationship between a radius of curvature of a curved portion and a crack resistance.

FIG. 6 shows a relationship between the radius of curvature R of the curved portions and the crack resistance property.

FIG. 6 shows that the crack resistance property is lowest when the radius of curvature R is 0 mm because the stress is intensively applied when the radius of curvature R of the curved portions 20b is smaller, and that the crack resistance property is gradually higher with an increase in the radius of curvature R. In particular, when the radius of curvature R is in the range of 1.3 to 1.6 mm (1.3 mm≤R≤1.6 mm), the crack resistance is significantly higher, and when the radius of curvature R exceeds 1.6 mm, the crack resistance is lowered.

Such a phenomenon occurs because of the following reasons. When the radius of curvature R of each of the curved portions 20b at both sides of the linear portion 20a is smaller, a stress generated due to bending of the belt is intensively applied to the both ends of the linear portion 20a to be likely to be a starting point of a crack. In contrast, when the radius of curvature R of each of the curved portions 20b is larger, the stress is not intensively applied to the both ends of the linear portion 20a. However, the width of the notch 20 is larger, and a contact area of the side surface of the belt with the pulley, that is, an area where a pressure is applied is reduced, resulting in a high securing force applied to a unit area of the side surface of the belt. As a result, due to the both sides of the notch 20 to which the high securing force is applied from the pulley, a tearing force is applied to the notch 20, and a crack may be likely to occur. Accordingly, in view of reducing occurrence of a crack due to a stress intensively applied to the both ends of the linear portion 20a, and reducing occurrence of a crack due to a tearing force applied to the notch 20, the radius of curvature R of the curved portions 20b is preferably 1.3 to 1.6 mm (1.3 mm≤R≤1.6 mm).

As described above, after considering all the results of the belt running test, in particular, the length L of the linear portion 20a in the bottom of the notch 20 is 0.5 mm or more, and the radius of curvature R of the curved portion 20b is 1.3 to 1.6 mm, thereby making it possible to prevent the pulley surface from being worn out in a short time, and obtain a crack resistance property similar to that obtained in the wrapped V-belt without notches.

In the embodiment, the notched, wrapped V-belt B has been described. The present invention is also applicable to, e.g., a low-edge, cogged V-belt that is a notched V-belt not having an outer-cover canvas 14 (in this case, adjacent cogs correspond to the notches).

The present invention is useful for a notched transmission belt provided with a plurality of notches on the inner surface side of a belt body.

The embodiment has been described above as example techniques of the present invention, in which the attached drawings and the detailed description are provided. As such, elements illustrated in the attached drawings or the detailed description may include not only essential elements for solving the problem, but also non-essential elements for solving the problem in order to illustrate such techniques. Thus, the mere fact that those non-essential elements are shown in the attached drawings or the detailed description should not be interpreted as requiring that such elements be essential. Since the embodiment described above is intended to illustrate the techniques in the present invention, it is intended by the following claims to claim any and all modifications, substitutions, additions, and omissions that fall within the proper scope of the claims appropriately interpreted in accordance with the doctrine of equivalents and other applicable judicial doctrines.

What is claimed is:

1. A notched, wrapped V-belt comprising:
   an endless belt body having a V-shaped cross-section and an outer peripheral surface covered with an outer-cover canvas, and
   a plurality of notches each extending in a width direction of the belt on an inner surface side of the belt body and arranged so as to be aligned with one another along a longitudinal direction of the belt, wherein
   a bottom of each of the notches in a cross-section taken along a plane orthogonal to the width direction of the belt includes a linear portion at a center, and recessed curved portions continuously formed at both sides of the linear portion,
   the notched, wrapped V-belt is specified in JIS A type,
   the linear portion has a length of 0.5 to 2.0 mm, and each of the curved portions has a radius of curvature of 1.3 to 1.6 mm.

2. The notched, wrapped V-belt of claim 1, wherein each of arrangement pitches of the notches is 9.0 to 11.0 mm.

* * * * *